RE 25339
July 10, 1962 — W. V. SORNSEN — 3,043,565
PNEUMATIC TIRE SPREADER
Filed Jan. 23, 1961 — 3 Sheets-Sheet 1
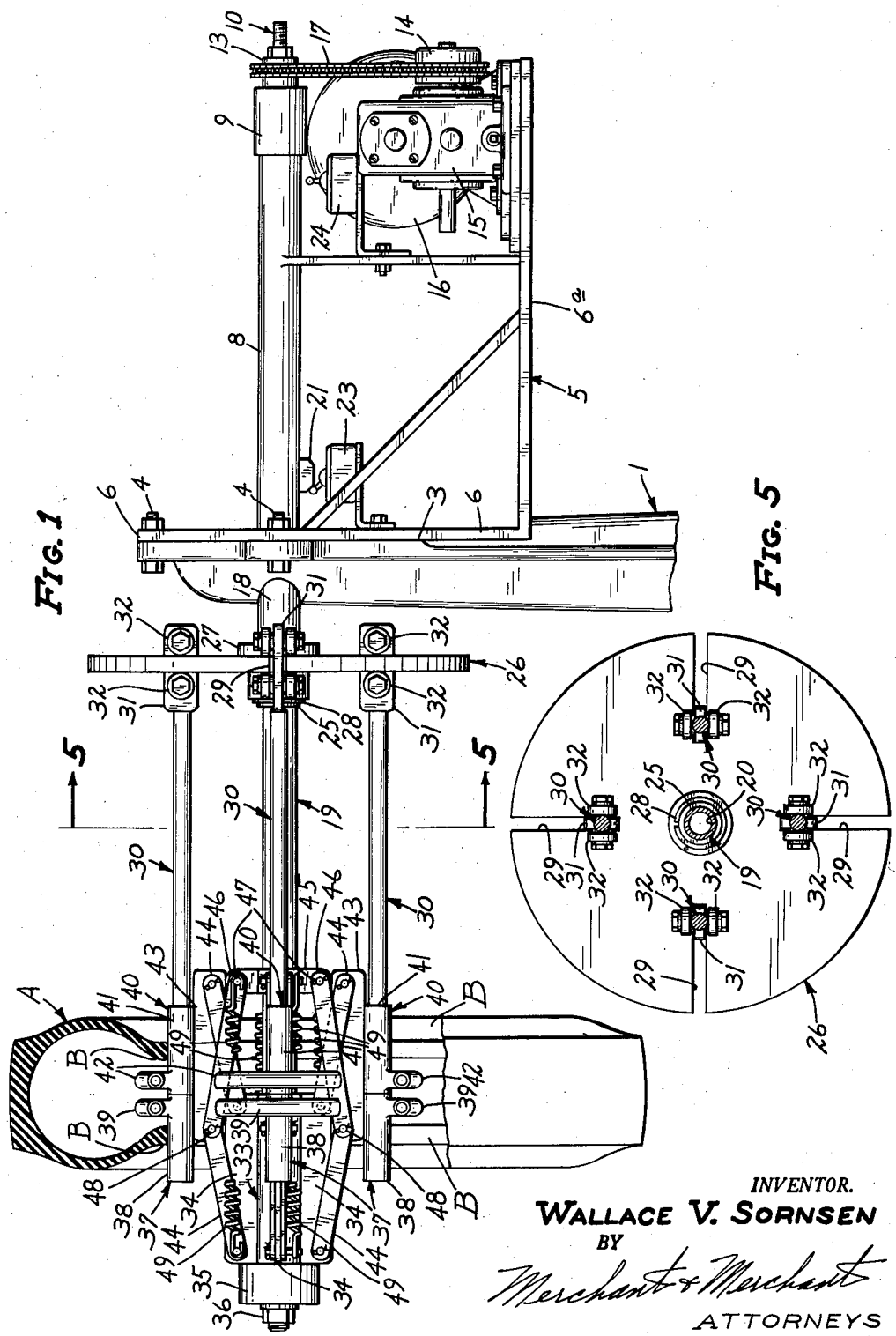
INVENTOR.
WALLACE V. SORNSEN
BY
*Merchant & Merchant*
ATTORNEYS

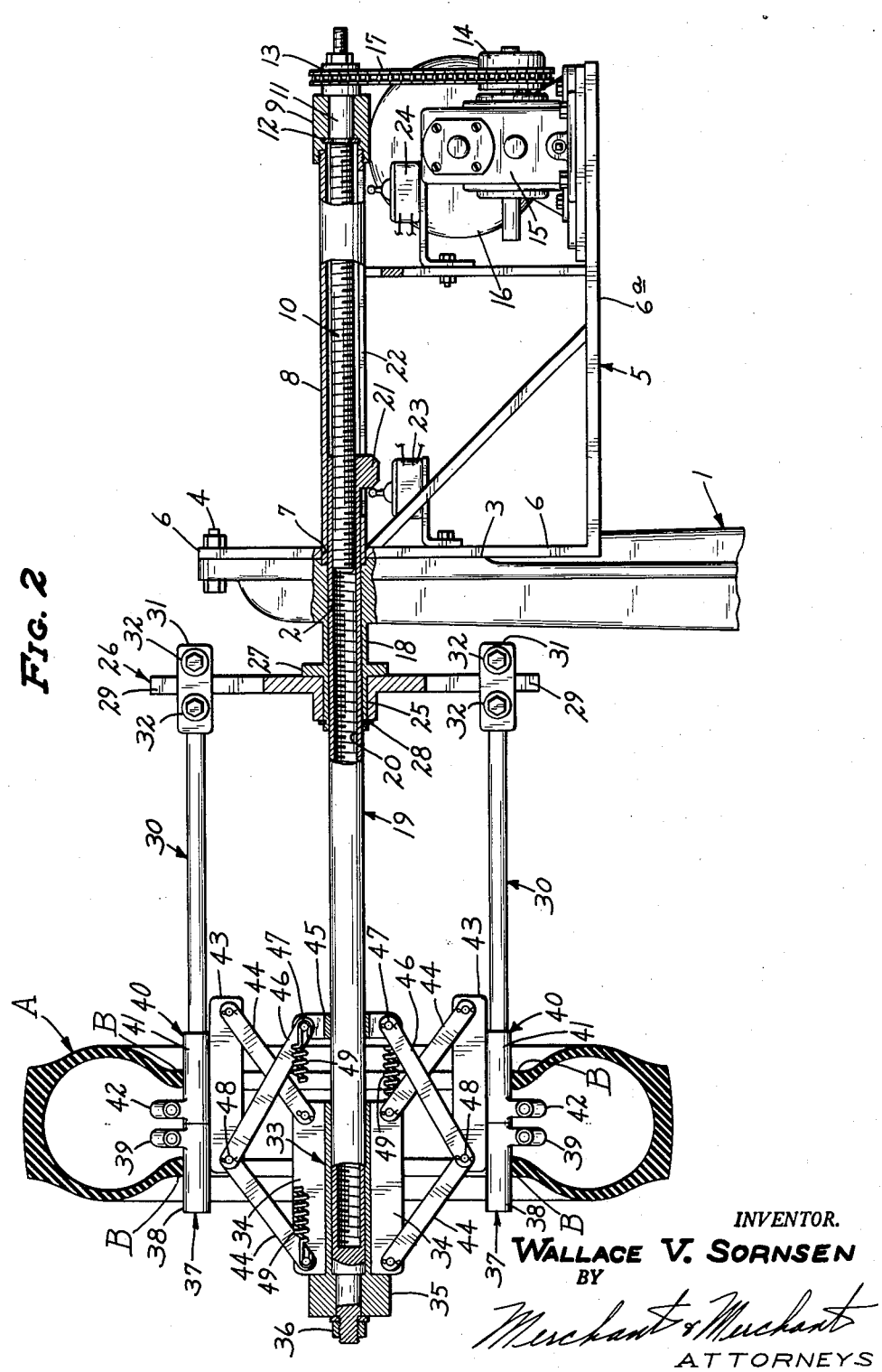

INVENTOR.
WALLACE V. SORNSEN
BY
Merchant & Merchant
ATTORNEYS

3,043,565
PNEUMATIC TIRE SPREADER
Wallace V. Sornsen, Minneapolis, Minn., assignor to
Paul E. Hawkinson Company, Minneapolis, Minn., a
corporation of Minnesota
Filed Jan. 23, 1961, Ser. No. 84,143
3 Claims. (Cl. 254—50.4)

My invention relates generally to improvements in pneumatic tire spreaders and more particularly to tire spreaders of the so-called inside arm type.

More specifically my invention relates to pneumatic tire spreaders of the type wherein the circumferentially spaced cooperating pairs of tire bead (or side wall) engaging spreader elements, as well as the arms upon which said spreader elements are mounted, are inserted into the opening defined by the tire casing (as distinguished from around the tire) as an initial step. In spreaders of this type, it is therefore necessary to first move the spreader elements radially outwardly to cause engagement thereof with the beads and/or side walls. Thereafter, it is necessary to impart axial spreading movements to the spreader elements to spread apart the beads and side walls of the tire. Heretofore entirely separate mechanical devices and arrangements have been utilized to move the spreader elements radially inwardly and outwardly with respect to each other, and axially toward and away from each other for the purpose of spreading or releasing the tire side walls.

The primary object of my invention is the provision of a device of the class described in which a single and highly novel mechanical arrangement of parts is utilized to successively achieve both the radial and axial spreading movements of the cooperating pairs of spreader elements.

A further object of my invention is the provision of a device of the class immediately above described which may be motor driven, as distinguished from pneumatically or hydraulically, and consequentially affords a maximum of safety to the operator.

A further object of my invention is the provision of a device of the class above described which may be operated with a minimum of previous knowledge and/or skill.

A further object of my invention is the provision of a device of the class described which incorporates a minimum of working parts, is rugged and durable in construction, and may be produced at a relatively low cost.

The above and still further objects of my invention will become apparent from the following detailed specification, appended claims, and attached drawings.

Referring to the drawings, wherein like characters indicate like parts throughout the several views:

FIG. 1 is a view in side elevation of my novel spreader;

FIG. 2 is an enlarged fragmentary view corresponding generally to FIG. 1 but showing a different position of some of the parts thereof;

FIG. 5 is a view in section taken on the line 5—5 of FIG. 1.

Figure 4:
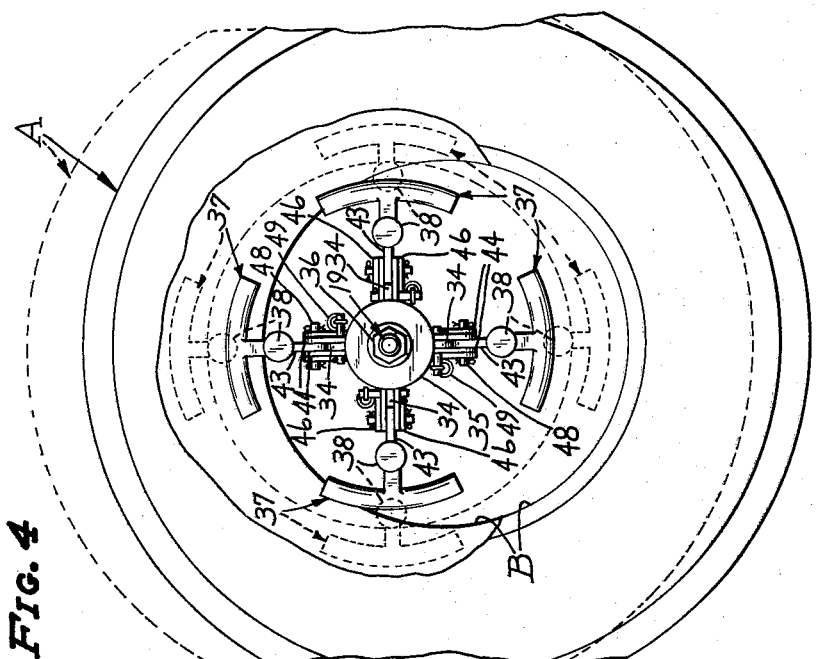
FIG. 4 is a view in end elevation.

Referring with greater particularity to the drawings, numeral 1 indicates in its entirety a generally upright mounting pedestal, which is bored at its upper end portion to provide a horizontal bearing 2. Rigidly secured to the rear surface 3 of the pedestal 1, by any suitable means such as nut-equipped bolts 4, is a generally L-shaped mounting bracket 5. As shown, the vertical portion 6 of the mounting plate 5 is counterbored as at 7 for the non-rotative reception of the inner end of a tubular housing 8, which is concentric with the bearing 2 and has an internal diameter corresponding to that of the bearing 2. Rigidly secured to the extreme rear end of the tubular housing 8 is a tubular bearing 9.

Loosely received within the housing 8 is an elongated screw 10 the rear end portion 11 of which is journalled for rotation within the bearing 9. A conventional lock ring 12 locks the screw 10 against axial rearward movements. Fastened on the screw member 10, exteriorly of the bearing 9, is a sprocket 13. Entrained over the sprocket 13 and the sprocket 14, associated with a reduction box 15 and a reversible electric motor 16 respectively mounted on the horizontal portion 6a of the bracket 5, is a chain 17 for purposes of imparting rotation to the screw element 10.

Shown as formed integrally with and projecting forwardly from the pedestal 2 is a tubular bearing boss 18. The forwardly projected end of the screw element 10 projects loosely through the bearing 2 and bearing boss 18. Snugly received within the bearing 2 and the bearing boss 18 is a tubular traveller 19, the interior surface 20 of which has threaded engagement with the screw element 10. To positively preclude rotation of the traveller 19 with respect to the screw element 10, said traveller 19 at its rear end is formed to define a depending ear 21 which projects downwardly through an elongated axially extended slot 22 formed in the tubular housing 8.

With the mechanism described at this point, it should be obvious that rotation of the electric motor 16 in one direction will cause forward extending movements to be imparted to the traveller 19 to a point where the ear 21 engages a conventional limit switch 23; whereas rotation of the motor 16 in the opposite direction will cause retracting movements to be imparted to the traveller 19 to a point where said ear 21 engages the limit switch 24. At its forward end the tubular bearing boss 18 is formed to define a trunnion 25 for rotative reception of a vertically disposed disc-like mounting plate 26. Rearward movements of the plate 26 are limited by engagement with an annular flange 27 formed integrally with the bearing boss 18; whereas forward movements thereof are limited by a conventional lock washer 28.

As shown, the mounting plate 26 is formed to define a plurality of radially outwardly opening slots 29. A plurality of mounting arms 30, one for each of the slots 29, have their inner end portions 31 slidably received within one of said slots 29. Preferably, the inner end portions of the arms 30 are provided with roller elements 32 which bear on opposite surfaces of the mounting plate 26 adjacent opposite sides of their respective slots 29, thereby limiting axial movements of the arms 30 while facilitating radial movements thereof.

As shown, the extensible and retractable traveller 19 projects forwardly from the mounting plate 26 and has rotatably mounted on its outer end a sleeve-like member 33 having circumferentially spaced axially extended radially projecting mounting flanges 34. Welded or otherwise rigidly secured to the outer end of the sleeve 33 and overlying the forward end of the extensible and retractable member 19, is a collar 35. The reduced solid forward end of the extensible member extends rotatively through the collar 35 and is provided with a nut, as at 36, to limit axially outer movements of the sleeve 33 and structure carried thereby.

At their extreme outer ends the mounting arms 30 are provided with tire side wall engaging spreader elements identified in their entireties by the numeral 37 and including enlarged heads 38 and shoes 39 which are rigidly fixed thereto. Mounted for axial sliding movements on the arms 30, intermediate the relatively fixed spreader elements 37 and the inner end portions 31 thereof, are spreader elements identified in their entirety by the numeral 40 and including sleeves 41 and shoes 42. It will be seen that for each relatively fixed spreader element 37 there is a cooperating relatively movable spreader element 40.

Rigidly secured to each of the sleeves 41 and projecting radially inwardly therefrom are axially extended mounting flanges 43. Extending between each of the mounting flanges 43 and the mounting flanges 34 carried by the sleeve 33 are pivoted parallelogram links 44. Slidably mounted on the extensible and retractable member 19 intermediate the sleeve 33 and the mounting plate 26 is a sliding collar 45. A plurality of actuator links 46 have their inner ends pivotally secured at circumferentially spaced points to the collar 45, as indicated at 47, and have their outer ends pivotally secured one each to one of the mounting flanges 43 associated with the relatively movable spreader elements 40, as indicated at 48.

Interposed, at circumferentially spaced points, between the rotary-sliding collar 45 and the rotary sleeve 33 are a plurality of relatively stout coil tension springs 49. It will be obvious that the springs 49, through the medium of the parallelogram links 44 and the actuator links 46, yieldingly bias the arms 30 and the relatively fixed and relatively movable spreader elements 37, 40 carried thereby to the radially expanded condition of FIG. 2. However, when it is desired to radially retract the arms 30 and the spreader elements 37, 40 carried thereby, so as to mount thereon or dismount therefrom a pneumatic tire A, this may be accomplished by imparting extreme extending movements to the traveller 19. During such movement, the sleeves 41 of the movable spreader elements 40 engage the heads 38 of the relatively fixed spreader elements 37. Thus, final extending movements of the traveller 19 will cause collapse of the parallelogram links 44 and actuator links 46, as shown in FIG. 1, against the yielding bias of the springs 49.

Figure 3:
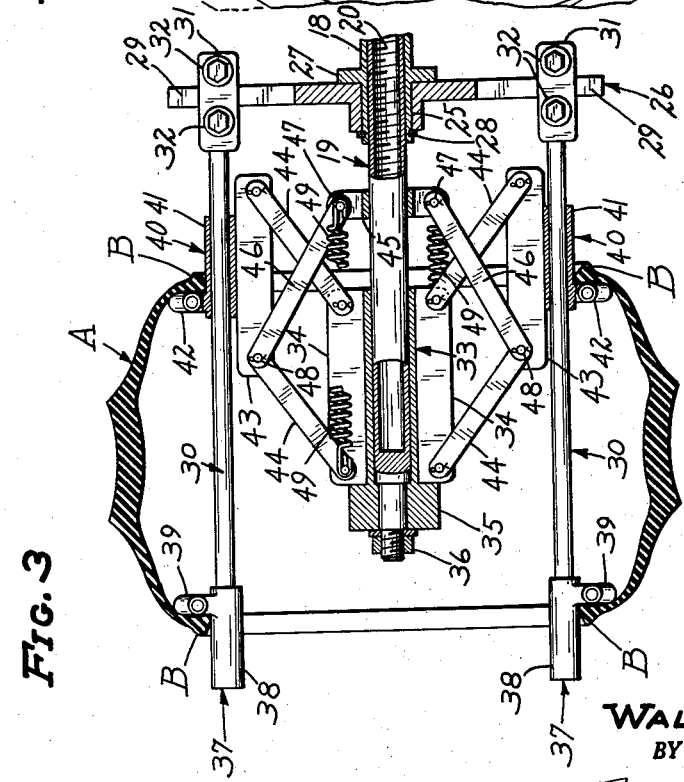
FIG. 3 is a view corresponding to FIG. 2 but showing a still different position of some of the parts.

When a tire casing A is hung over the uppermost spreader elements 37, 40, with the spreader shoes 39, 42 respectively interposed between the beads B thereof, initial retracting movements of the traveller 19 will cause radial expansion of the arms 30 to a point where the heads 38 and sleeves 41 associated respectively with the fixed and movable spreader elements 37, 42 engage the beads B of the tire A. (In the absence of a tire casing A, radial outward movements of the arms 30 and parts carried thereby is limited by engagement of the slide collar 45 with the sleeve 33.) After engagement of the spreader elements 37, 40 with the beads B of the tire casing A, further retracting movements of the traveller 19 are translated into relative spreading moevments of the shoes 39, 42, through sliding action of the spreader elements 40 on their respective arms 30 in the direction of the mounting plate 26, as indicated in FIG. 3. Obviously, and as there shown, the beads B of the tire A are thus spread apart to circumferentially reduce the dimensions of the tire A for any one of a number of purposes, such as entering the same into and removing the same from an endless tire retreading mold, not shown. When and if it is desired to rotate the spread tire for purposes of inspection or the like, this may be done merely by bringing pressure to bear upon the tire in either direction, as the mounting plate 26, the sleeve 33, and the collar 45 are all rotatably mounted with respect to the traveller 19.

My invention has been thoroughly tested and found to be completely satisfactory for the accomplishment of the above objects, and while I have shown a preferred embodiment thereof I wish it to be specifically understood that the same may be capable of modification without departure from the scope and spirit of the appended claims.

What I claim is:

1. In a tire spreader, an elongated axially extensible and retractable member, a plurality of elongated mounting arms disposed in circumferentially spaced parallel relationship about the axis of said member, means mounting said arms for bodily movements radially of said member, a plurality of relatively stationary spreader elements fixedly mounted one each on a different one of said arms, a plurality of relatively movable spreader elements one each axially slidably mounted on a different one of said arms for movements toward and away from said respective ones of said stationary spreader elements, a plurality of pairs of parallel links each pair thereof operatively connecting said member with a different one of said relatively movable spreader elements, a plurality of actuator links one each pivotally connected at one end to a different one of said relatively movable spreader elements, means operatively connecting the other ends of said actuator links to said extensible and retractable member for pivotal and axial sliding movements with respect thereto, and spring means connected to said last-mentioned means and to said extensible and retractable member and yieldingly urging said actuator links in directions of swinging movement to impart radially outward movements to said spreader elements and mounting arms, said parallel links being arranged to impart radially inward movements to said spreader elements and mounting arms against the bias of said springs when said movable spreader elements are slidably moved into engagement with said stationary spreader elements responsive to extending movements of said retractable member.

2. The structure defined in claim 1 in which the arm mounting means comprises a disc-like mounting plate having a central bearing portion for slidable and rotatable reception of said extensible and retractable member and having a plurality of radially extended slots, said arms having inner end portions slidably received one each in a different one of said slots, and means for limiting axial movements of said arms in said slots.

3. The structure defined in claim 2 in which said last-mentioned means comprises roller elements journalled on said inner end arm portions and bearing against opposite sides of said mounting plate.

References Cited in the file of this patent
UNITED STATES PATENTS

| | | |
|---|---|---|
| 445,296 | Adams | Jan. 27, 1891 |
| 1,533,990 | Hough | Apr. 14, 1925 |
| 2,558,398 | Tyler | June 26, 1951 |
| 2,809,674 | Ward | Oct. 15, 1957 |
| 2,919,893 | Branick | Jan. 5, 1960 |